(12) United States Patent
Arutyunyan et al.

(10) Patent No.: US 11,546,463 B2
(45) Date of Patent: Jan. 3, 2023

(54) SYSTEMS AND METHODS FOR MANAGING SOFTWARE TELEPHONES

(71) Applicant: ServiceTitan, Inc., Glendale, CA (US)

(72) Inventors: Bella Arutyunyan, Glendale, CA (US); Aaron Alter, Glendale, CA (US)

(73) Assignee: ServiceTitan, Inc., Glendale, CA (US)

( * ) Notice: Subject to any disclaimer, the term of this patent is extended or adjusted under 35 U.S.C. 154(b) by 0 days.

(21) Appl. No.: 16/930,245

(22) Filed: Jul. 15, 2020

(65) Prior Publication Data

US 2021/0021704 A1    Jan. 21, 2021

Related U.S. Application Data

(60) Provisional application No. 62/874,048, filed on Jul. 15, 2019.

(51) Int. Cl.
*H04M 3/42*     (2006.01)
*H04M 7/00*     (2006.01)
*H04M 3/22*     (2006.01)

(52) U.S. Cl.
CPC ....... *H04M 3/42297* (2013.01); *H04M 3/229* (2013.01); *H04M 3/42289* (2013.01); *H04M 7/006* (2013.01)

(58) Field of Classification Search
CPC combination set(s) only.
See application file for complete search history.

(56) References Cited

U.S. PATENT DOCUMENTS

| 8,265,258 | B2 † | 9/2012 | Brown | |
|---|---|---|---|---|
| 8,638,908 | B2 † | 1/2014 | Leeds | |
| 9,501,752 | B2 † | 11/2016 | Kadosh | |
| 9,510,158 | B2 † | 11/2016 | Das | |
| 9,590,936 | B2 † | 3/2017 | Jarrett | |
| 9,929,950 | B2 † | 3/2018 | Phelan | |
| 10,368,284 | B2 † | 7/2019 | Lau | |
| 2002/0026371 | A1* | 2/2002 | Kishi | G06Q 30/06 705/7.11 |
| 2002/0086689 | A1† | 7/2002 | Moran | |
| 2011/0110276 | A1 | 5/2011 | Rae | |

(Continued)

FOREIGN PATENT DOCUMENTS

EP    2360958 B1 †   3/2015

*Primary Examiner* — Phung-Hoang J Nguyen
(74) *Attorney, Agent, or Firm* — BakerHostetler (57) ABSTRACT

Aspects of the present disclosure involve systems, methods, computer program products, and the like, for managing software telephones and telephone services, such as customer service support or sales, for multiple clients. Methods consistent with the present disclosure may be implemented as non-transitory computer-readable storage medium, where a processor executes instructions out of a memory when services are provided or organized during a telephone call or a text message communication session. In general, a telephone or text messaging service may be managed along multiple different components including origination services, platform services, and termination services without introducing additional conferencing and/or secondary voice conferencing sessions to calls between clients and respective customers.

8 Claims, 7 Drawing Sheets

(56) References Cited

U.S. PATENT DOCUMENTS

| | | | |
|---|---|---|---|
| 2012/0134480 A1* | 5/2012 | Leeds | H04M 1/65 |
| | | | 379/88.12 |
| 2013/0003958 A1 | 1/2013 | Brown et al. | |
| 2015/0363721 A1* | 12/2015 | Kadosh | H04M 7/006 |
| | | | 705/7.13 |
| 2016/0135104 A1* | 5/2016 | Lau | H04W 36/30 |
| | | | 455/436 |
| 2016/0212600 A1 | 7/2016 | Backhaus et al. | |
| 2017/0078922 A1 | 3/2017 | Raleigh et al. | |
| 2018/0309872 A1† | 10/2018 | McGarry | |

\* cited by examiner
† cited by third party

SYSTEMS AND METHODS FOR MANAGING SOFTWARE TELEPHONES

CROSS-REFERENCE TO RELATED APPLICATIONS

The present application claims the priority benefit of provisional U.S. patent application 62/874,048, filed Jul. 15, 2019, the disclosure of which is incorporated by reference herein.

BACKGROUND OF THE INVENTION

Field of the Invention

The present invention generally relates to software telephones and systems for managing the same. More specifically, aspects of the present invention provide solutions for improving the efficiency of customer order processing and fulfillment.

Description of the Related Art

Typically, in managed software telephone systems, a customer call to a client is forwarded to an intermediary third-party host where both customer and client may have respective voice calls forwarded in order to engage in a conversation. In particular, a client may provide a telephone number for receiving forwarded customer calls (e.g., to a particular proxy telephone number) and, when a call to the proxy is received, the client provided telephone number is automatically dialed in order to conference the customer and client calls. However, because respective call paths for the customer voice and the client voice are essentially connected by a third-party conference call, various issues may arise such as, for example, delays, call quality issues (e.g., audio quality issues, call drops, etc.), increased failure points along the call path due to an increased number of hops, and the like.

It is with these observations in mind, among others, that aspects of the present disclosure were concerned and developed.

SUMMARY

Embodiments of the present invention generally relate to systems and methods for managing software telephones.

In one embodiment, a method includes receiving a firm order commit (FOC) date for porting service for a client from a first carrier to a second carrier, updating service routing logic to use the second carrier based on the FOC date and a service provider identification (SPID) associated with the client, transmitting a text message via the first carrier using an electronic service provider identification (ESPID) associated with the client, a copy of the text message stored in a buffer, receiving a failed delivery notice for the transmitted text message, transmitting the text message via the second carrier using the ESPID, removing the copy of the text message from the buffer, and updating carrier information associated with the client, the carrier information directing future text message routing.

In one embodiment, the method further includes receiving, from a client, client location information including one or more of: a zip code, locale identification, area code, and state identification, requesting a telephone number from a carrier within one or more of the zip code, the locale identification, the area code, or the state identification, and receiving at least one telephone number back from the carrier in response to the request, and automatically assigning the at least one telephone number to the client.

In one embodiment, the method further includes receiving a call event data packet including a recipient telephone number and a call recording, querying a customer database based on the recipient telephone number to retrieve a customer identification, storing and associating the call recording with the customer identification, and associating the stored call recording with a most recent job associated with the customer identification.

BRIEF DESCRIPTION OF THE DRAWINGS

The description will be more fully understood with reference to the following figures, which are presented as various embodiments of the disclosure and should not be construed as a complete recitation of the scope of the disclosure, wherein.

DETAILED DESCRIPTION

Aspects of the present disclosure involve systems, methods, computer program products, and the like, for managing software telephones and telephone services, such as customer service support and the like, for multiple clients. Methods consistent with the present disclosure may be implemented as non-transitory computer-readable storage medium, where a processor executes instructions out of a memory when services are provided or organized during a telephone call or a text message communication session. In general, a telephone service may be managed along multiple different components including origination services, platform services, and termination services without introducing additional conferencing and/or secondary (e.g., non-switch hosted) voice conferencing sessions to calls between clients and respective customers.

Telephone services may be provided by one or more service carriers, where each service carrier may operate a plurality of networked computing devices that transfer communications associated with the generation, processing, or fulfillment of customer orders. A particular service carrier may be classified as a common carrier or a private carrier that provide message transport services via the Internet, cell phone networks, radio networks, satellite networks, cable networks (e.g. Comcast™ or AT&T™), other communication network, or a combination thereof. When providing services, a service carrier may send and receive communications via one or more types of communication mediums using one or more types of communication technology. For example, communications may be sent via cellular radio transmissions using voice over internet protocol (VOIP) or text communication technology.

Type of services that may be performed by a service carrier include origination services, platform services, and termination services. Actions associated with an origination service may include colleting customer contact information (e.g. customer names, phone numbers, or addresses). An origination service may be directly managed by respective service carriers and includes telephone number hosting. For example, when someone wishes to acquire a particular telephone number, that telephone number may be purchased from and directly managed by a carrier. Telephone numbers that are purchased or otherwise collected may belong to customers or prospective customers.

A platform service may be a Cloud computing service operated by a service carrier that allows customers (e.g. other service carriers) to develop, run, and manage program applications without building and maintaining infrastructure required to develop and launch those program applications. As such, a platform service may be implemented by a platform service carrier or other service carriers that directly interact with end customers. Platform services can generally include a switch (e.g., level four or level five switch, etc.) or other devices for hosting audio sessions and enforcing forwarding logics related to call routing. Further, termination services generally connect outgoing calls to a target recipient and may include managing call transit across multiple intermediary carriers.

In some examples, various aspects of the above telephone services (e.g., origination, platform, termination, etc.) can be managed and maintained by an automated system for seamless service transfers (e.g., changes in carriers), backup redundancies, and service integrations (e.g., analytics, dialing, logging, etc.).

In some cases, telephone numbers (e.g., for a customer) may be ported, or transferred, from one carrier to another while avoiding disrupting voice and/or text service for the respective telephone numbers. In some examples, telephone numbers may be ported as part of a change in service contract (e.g., between the customer and the carrier) or the telephone numbers may be ported as part of a call fault detection and backup service (e.g., maintaining and applying service redundancies, etc.). An origination service provider may hand off a call initiated over the public switch telephone network (PTSN) with a potential customer to another carrier service provider via a process that switches the call from the PTSN to a VOIP communication network.

In one example, where a customer wishes to port service (e.g., telephone numbers) from one carrier to a new carrier, a firm order commitment (FOC) date may be determined by the first carrier and the new carrier as to when voice service may switch over between the two carriers. The FOC date may be specified to a high granularity, such as date-hour-minute-seconds. However, in some cases, text service may switch over between the two carriers with a lower level of granularity (e.g., date-hour-minute, date-hour, etc.) and a text service transferring system may be used to seamlessly transition text service between the carriers at an unknown time while avoiding any service disruptions from the perspective of the customer porting service between carriers. Here again, calls may be switched between a first communication network, such as the PSTN and a second network, such as a VOIP network or may be switched between different VOIP networks or carriers.

In some cases, two different service carriers can provide respective voice and text service for a single phone number. For example, a first carrier may assign a special provider identifier (SPID) to a telephone number for voice transmission and a second carrier may assign an electronic special provider identifier (ESPID) to the same telephone number for text transmission. As a result, each respective carrier can manage and service voice and text data transmissions over each respective carrier network based on the SPID and/or ESPID associated with the telephone number and, in some examples where service is being ported between carriers, respective voice and text service may not transfer between carriers at the same time. As such, the first carrier may continue to transfer voice transmissions while the second carrier transfers text messages to entities located at different endpoints of a voice and text communication session.

In one example, a text delivery monitoring system receives text message delivery updates from one or more carriers. For example, a text message may be provided to a carrier via an application programming interface (API) for delivery to a recipient (e.g., a client customer, etc.). In some examples, an ESPID associated with the text message sender may be provided with the text message to the carrier. The text message may be stored in a buffer pending success or failure of delivery of the text message to the recipient. Further, the API may provide back a success or failure response based on, for example, whether the respective carrier provides service for the respective ESPID. On receiving a success response from the carrier, the text delivery monitoring system may remove the text message from the buffer and await further messages. On receiving a failure response, the text delivery monitoring system can attempt to send the text message via API call through a different (e.g., as indicated in a FOC agreement or the like) carrier and await a respective success or failure response. Upon receiving a success response from the different carrier, the text message may then be deleted from the buffer and further messages may be transmitted via the different carrier. In effect, text service can be seamlessly transitioned between carriers in an automated fashion without a substantial delay of service for a respective client. In such instances, communications with the second text message service provider may be associated with the ESPID may identify more than one carrier, where one carrier may be used initially and when a message transmitted to a recipient fails another carrier associated with the ESPID may be use to re-transmit the message. Alternatively, an ESPID originally associated with a message and with a first message service provider may be re-associated with a second message service provider when a message transmission error or outage occurs.

In one example, telephone numbers can be automatically ported to a particular (e.g., preferred, default, etc.) carrier during an account creation (e.g., of a client account, etc.). Account information, provided by the client, can be used to automatically purchase (from the carrier) an optimal telephone number which may be used, for example, as an origination number for a software telephone or the like. Account information may include billing zip code or the like and, once the telephone number has been purchase, it may be automatically assigned to the software (programmable or configured) telephone.

In some examples, an account management system may automatically and iteratively attempt to purchase a telephone number as closely corresponding to the account information as possible. For example, a four-tiered iteration may first attempt to purchase a telephone number associated with the billing zip code for the client. If no telephone numbers are available, a telephone number associated with a respective locale (e.g., city, etc.) may be attempted, then area code, then state, etc. As a result, upon account creation, a client may automatically be assigned a telephone number for a respective software telephone corresponding as closely as possible to the client location (e.g., company or billing address).

In some examples, a customer service representative (CSR) (for a client) may use a software telephone interface, such as a graphical user interface (GUI) or the like, to call out to a recipient such as a homeowner, customer, etc. Upon selecting a call recipient, an API call (e.g., a front end JavaScript API) to a switch provider may be transmitted with outbound call identification to be used, recipient identification (e.g., telephone number), and client information. In response, the switch provider may automatically create a voice over internet protocol (VOIP) provider call session without directly interacting with a carrier service.

Further, outbound calls can be automatically identified and logged for analytics, training, archiving, etc., or discarded based on the call recipient telephone number. Once the outbound call is completed, an event data packet can be provided to a monitoring system with a recording of the call. The event data packet may include the recipient telephone number, which may be used to perform a query on a customer database for the respective client. If the query returns a customer identification, the customer identification may be further queried for a most recent job. The call recording can then be associated with any returned customer identification and/or the most recent job. In the case where no customer identification is returned, the call recording may be discarded or preserved in a database for non-customer calls or the like.

The disclosure now turns to a discussion of FIGS. 1-7 for the purposes of explanation and further understanding of the methods and systems disclosed herein. It is understood that FIGS. 1-7 are explanatory only and do not impute undue limitation. The exemplary embodiments may be modified, adapted, or otherwise changed without departing from the spirit and scope of the disclosure.

Figure 1:
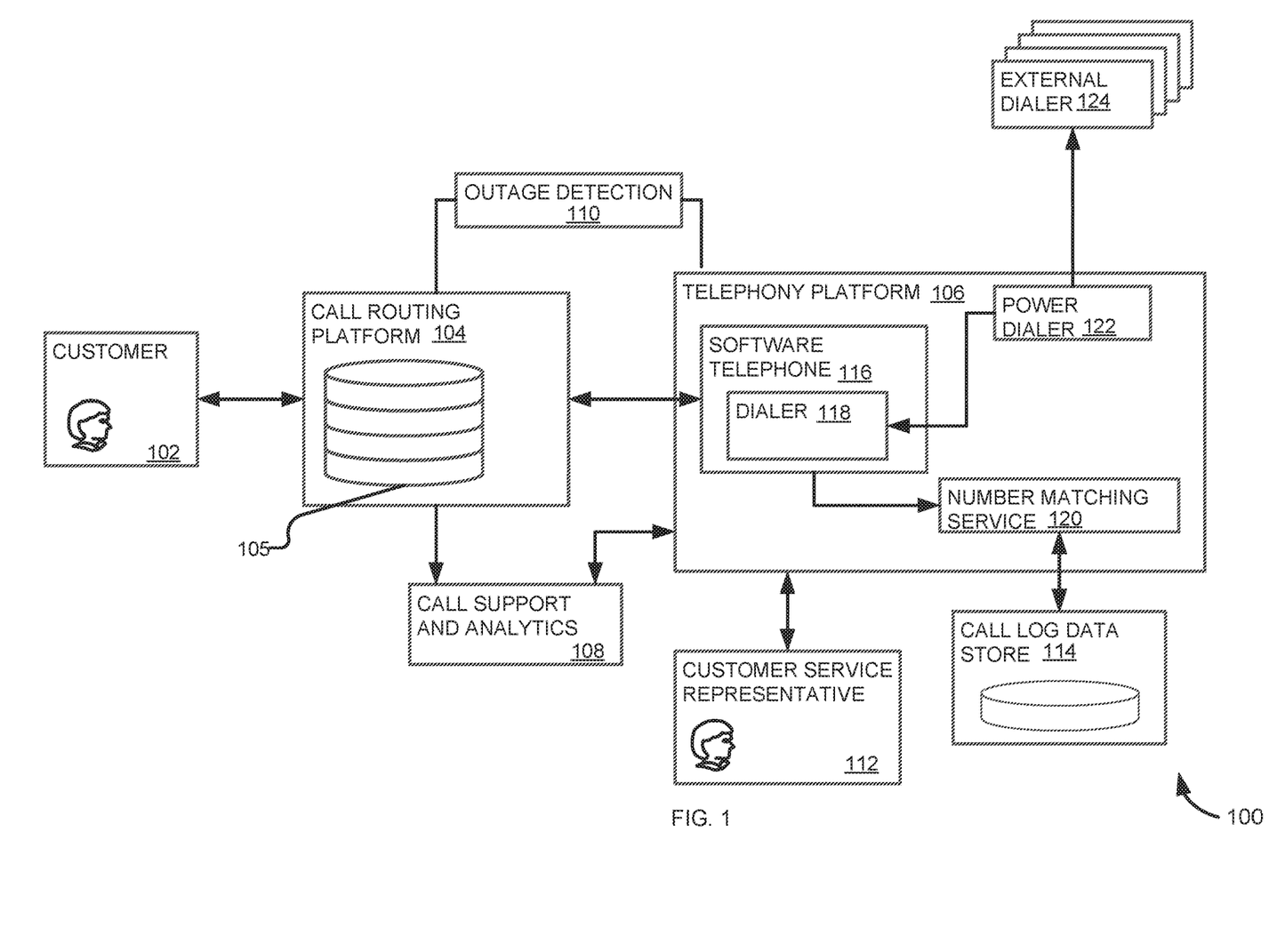
FIG. 1 is a block diagram of an example software telephone operating environment, in accordance with various embodiments of the subject technology.

FIG. 1 is a block diagram illustrating an example operating environment 100 for managing a software telephone system. A telephony platform 106 provides a communication conduit through which, for example and without imputing limitation, a customer 102 and customer service representative (CSR) 112 may interact. For example, customer 102 may call a company employing CSR 112 and be automatically directed to CSR 112 via a call routing platform 104 and telephony platform 106.

Call routing platform 104 includes a switch 105 capable of hosting voice communications and/or routing text data across a network such as a carrier network, the Internet (e.g., VOIP), etc. Call routing platform 104 interfaces with a software telephone 116. Software telephone 116 is part of telephony platform 106 and may be virtual device, software application, integrated device (e.g., remote, networked, virtualized, etc.), or the like. Calls run through telephony platform 106 may be recorded and/or logged in a call log data store 114, which may be, for example and without imputing limitation, a local server, remote server, cloud storage solution, virtualized storage device, a physical storage device, etc.

Further, telephony platform 106 and call routing platform 104 interface with an outage detection 110 for detecting and automatically resolving service outages. For example, where outage detection 110 detects a carrier outage, a backup carrier may be automatically engaged to maintain service without undue reduction in call service. In other examples, where outage detection 110 detects a switch outage, alternative service options may be engaged such as traditional carrier conferencing solutions and the like as described above. Further, outage detection 110 may alert administrators or the like to detected outages. Metrics associated with communication outages may be collected and stored for later access or analysis. Patterns detected from analyzing the collected metrics may be used to identify preferred carriers to switch further call or text message communication sessions to that should be more reliable. For example, communications made from a location where a customer is currently located may be switched to a service provider that is associated with a higher reliability for maintaining communications at that location than another service provider. In such instances, communications may be switched to a first service provider when a location based reliability metric associated with a first service provider is greater for a given location than a corresponding reliability metric associated with a second service provider and the given location.

Additionally, telephony platform 106 and call routing platform 104 may provide call data and call telemetry to a call support and analytics service 108. For example, call quality, latency, duration, etc. may be processed by call support and analytics 108. In some examples, natural language processing (NLP) and support may also be provided by call support and analytics 108. Here again reliability metrics may be analyzed and used to select a service provider to switch communications to. This process may include identifying which of a plurality of service providers have a higher quality of service metric. In such instances, a higher quality of service may be associated with one or a combination of a higher signal strength quality metric, a lower call latency metric, a lower outage metric, or a higher reliability metric, for example.

Telephony platform 106 includes software telephone 116, a power dialer 122, and a number matching service 120. Dialer 118 may provide a graphical user interface (GUI) through which CSR 112 may make outgoing calls to customers 102. In some examples, number matching service 120 may automatically identify customer information based on a telephone number dialed through dialer 118. In some examples, CSR 112 may select a customer for dialing by name or other identifier matched to a number by number matching service 120 and automatically dialed via dialer 118.

In some examples, power dialer 122 may receive a list of customer numbers for connecting one or more CSRs 122. Power dialer 122 can schedule, assign, and automatically connect multiple CSRs 112 to multiple customers 102 via dialer 118 and/or external dialers 124.

Figure 2:
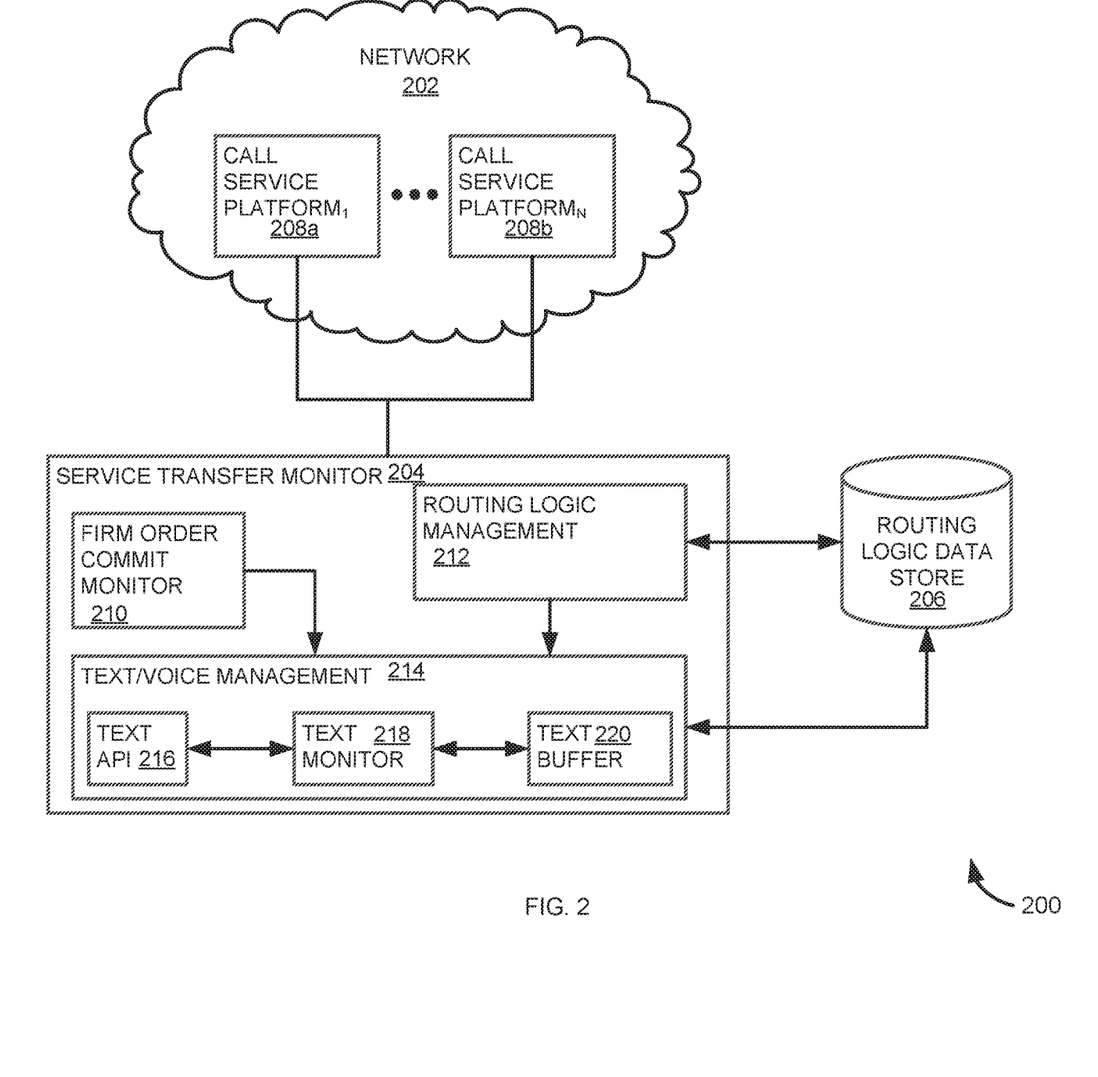
FIG. 2 is a block diagram of an example service transfer monitoring system environment, in accordance with various embodiments of the subject technology.

FIG. 2 is a block diagram of an example service transfer monitoring system environment, in accordance with various embodiments of the subject technology The block diagram of FIG. 2 illustrates operating environment 200 that includes service transfer monitor 204 that interacts with one or more call service platforms 208a-b via network 202. In particular, service transfer monitor 204 may provide a seamless transition of voice and text services between call service platforms 208a-b (e.g., carriers) due to a change in carrier for a customer. In some examples, service transfer monitor 204 may transition services between carriers in the event of a service outage or the like (e.g., as detected by outage detection 110 described above in reference to FIG. 1).

Call service platforms 208*a-b* may be hosted over a network 202 to which service transfer monitor 204 is also connected. Service transfer 204 includes a routing logic management 212 for interacting with, and managing, a routing logic data store 206. Routing logic data store 206 stores routing logic and associated data for managing call and text services from clients (e.g., CSRs) to respective customers. Data stored in routing data logic data store 206 may identify or include communication capabilities provided by various service providers, reliability metrics, failover preferences, or other information. Particular service providers may be selected based randomly or according to a set of preferences, rules, metrics, or analysis.

Additionally, service transfer monitor 204 includes a firm order commit (FOC) monitor 210 for identifying carrier transitions and porting telephone service provider identifications (SPIDs) and electronic service provider identifications (ESPIDS) between carrier appropriately. For example, when a FOC date occurs, FOC monitor 210 may engage routing logic management 212 to update routing logic data store 206 with updated carrier information. Service transfer monitor 204 also includes a text/voice management process 214.

Text voice management process 214 may update text communication (e.g., ESPID data) routing logic based on an active service monitoring. For example, text/voice management process 214 includes a text API 216 for transmitting text messages via a carrier according to rules stored in routing logic data store 206 and receiving a delivery confirmation or failure alert. In particular, a text monitor 218 may monitor the confirmations and/or alerts reported back via text API 216 and, in the case of a delivery failure for a text message associated with an account transferring services between call service platforms 208*a-b* (e.g., via FOC monitor 210), may automatically switch routing logic in routing logic data store 206 to the new call service platform 208*b* and resend a failed text message by retrieving the respective text message from a text buffer 220.

Figure 3:
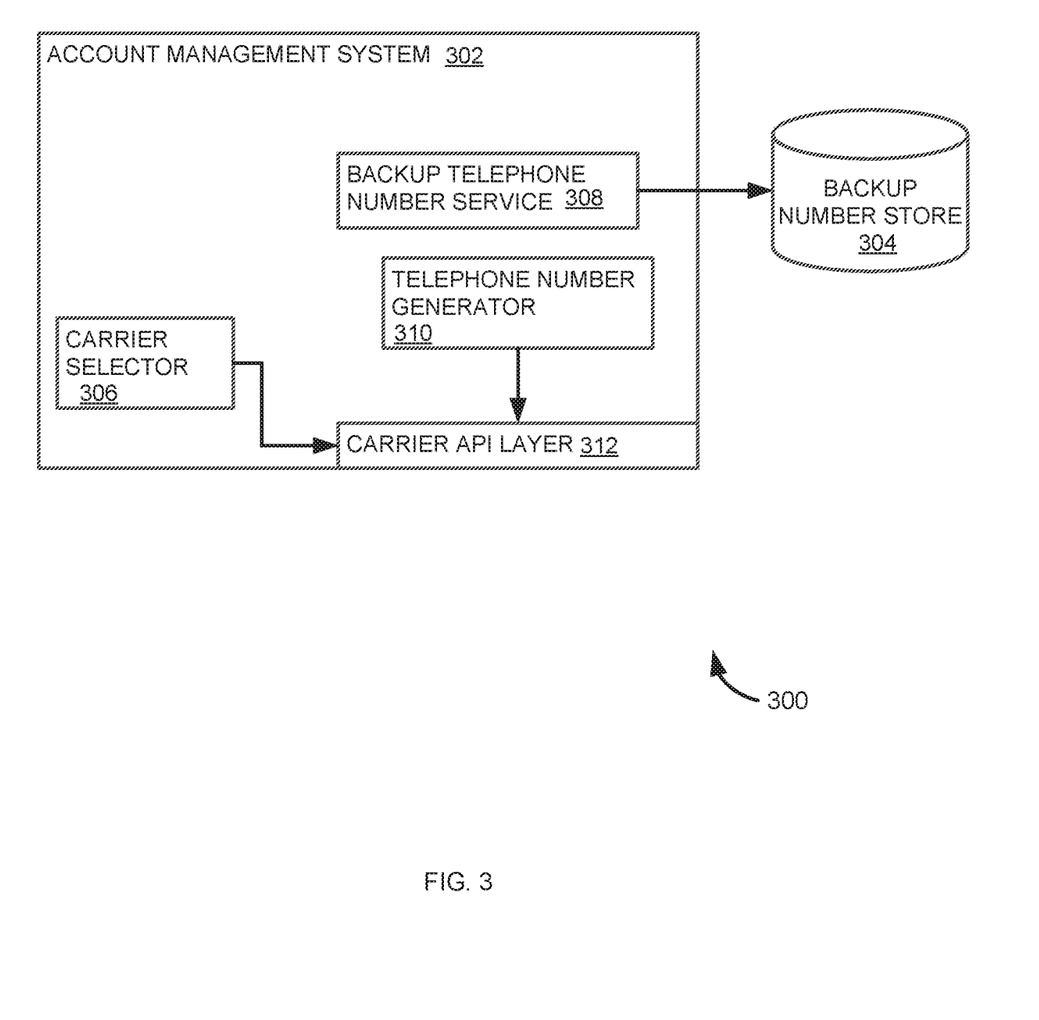
FIG. 3 is a block diagram of an example account management system, in accordance with various embodiments of the subject technology.

FIG. 3 is a block diagram illustrating an example account management environment 300 through which a client may use to set up a new account for managing a software telephone according to various embodiments disclosed herein. Account management environment 300 includes an account management system 302 which may interface with, for example telephony platform 106 and/or service transfer monitor 204 discussed above in respect to FIGS. 1-2, yet not depicted in FIG. 3. Account management system 302 may also interface with backup number store 304 that may store one or more telephone numbers for a client. In cases where a service outage is detected or the like, backup telephone number service process 308 may retrieve a backup telephone number from backup number store 304. Backup numbers stored at the backup number store 304 may be client specific and may have been identified when a client account was created.

Account management system 302 further includes a telephone number generator 310 for automatically assigning a relevant telephone number to a client at account creation. In particular, telephone number generator 310 may query a carrier service via carrier API layer 312. Carrier API layer 312 may be determined by a carrier selector 306, which may solicit a carrier choice from client account creation information.

Figure 4:
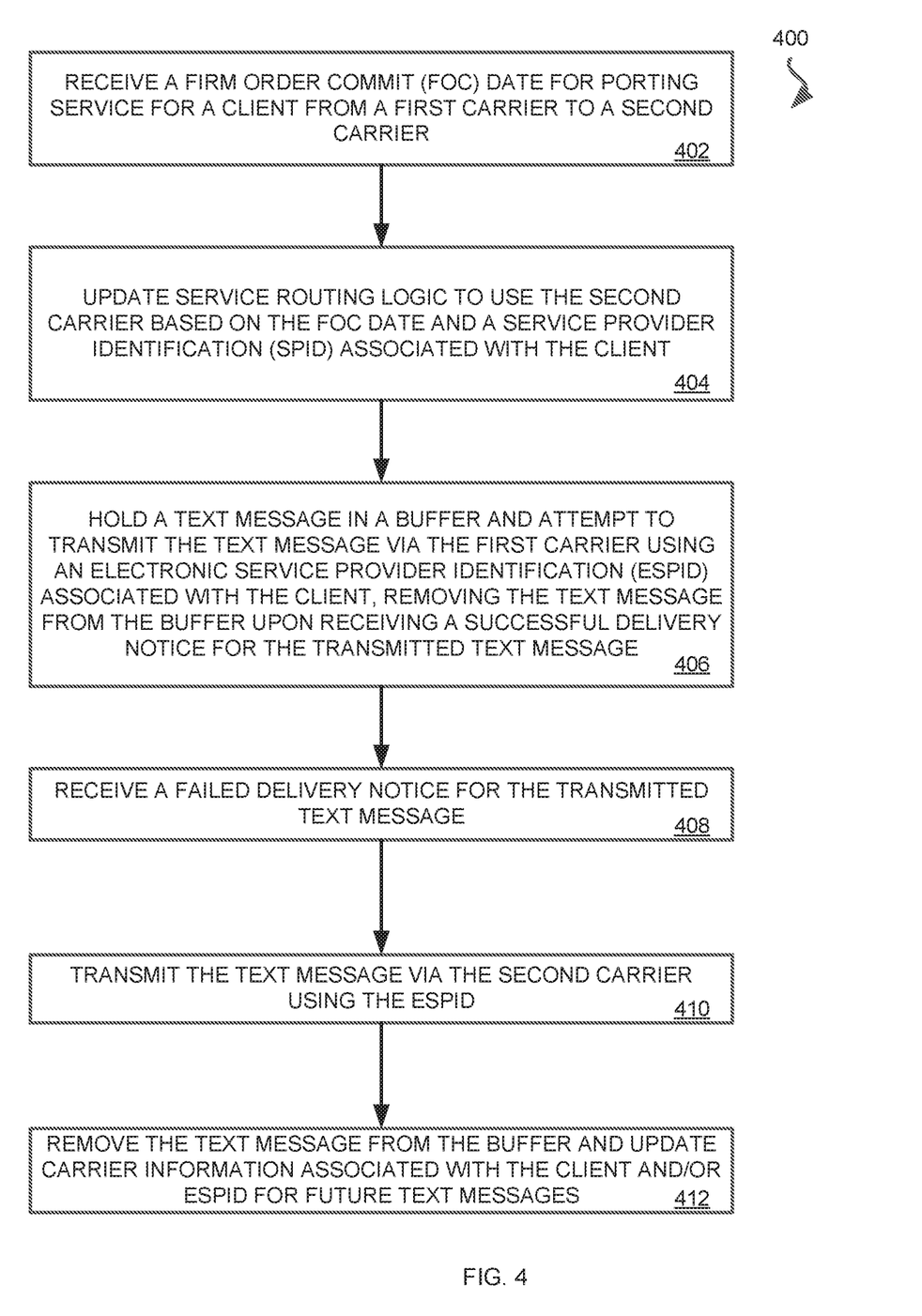
FIG. 4 is a flowchart depicting an example method for transferring text service between carriers according to a FOC date, in accordance with various embodiments of the subject technology.

FIG. 4 is a flowchart depicting a method 400 for transferring text service between carriers. Method 400 may be performed by, for example, service transfer monitor 204 discussed above in respect to FIG. 2. As a result, text service may be transferred seamlessly between carriers without a noticeable interruption in text message services, even in the case of an uncertain and ambiguously defined transfer window.

At step 402, a firm order commit (FOC) date is received for porting service for a client from a first carrier to a second carrier. At step 404, service routing logic is updated to use the second carrier based on the FOC date and a service provider identification (SPID) associated with the client. For example, a scheduler or monitor may await until the FOC date to update routing logic so that voice service may continue without interruption.

At step 406, a text message is held in a buffer and an attempt is made to transmit the text message via the first carrier using an electronic service provider identification (ESPID) associated with the client. The text message is removed from the buffer upon receiving a successful delivery notice for the transmitted text message (e.g., as an API return or the like). This process may include identifying that the ESPID has been associated with the FOC date and a rule that indicates that text message should be stored in the buffer until a successful delivery notice relating to the text message has been received. This rule may also identify activities to perform when the transmission of the text message fails or when a timer associated with the transmission of the text message times out. Methods consistent with the present disclosure may use the ESPID by identifying that the ESPID is cross-referenced with the first carrier. For example, a table stored in memory could identify a type of communication (e.g. text, audio, or video), an ESPID, and an initial carrier to send and received the type of communications via. An entry in this table could identify that a text message should be sent using the first carrier. This table could also identify a second carrier that should be sent the text message when a previous transmission of the text message sent by the first carrier fails. As such, the table could cross-reference a type of message with a first and a second carrier that could be used to send message data based on a fail-over rule associated with data included in the table.

At step 408, a failed delivery notice is received for the transmitted text message. At step 410, the text message is transmitted again via the second carrier using the ESPID according to the rule. At step 412, the text message transmitted via the second carrier is removed from the buffer and carrier information associated with the client and/or ESPID is updated for future text messages. In other words, text message routing logic is updated to route text messages through the second carrier.

Figure 5:
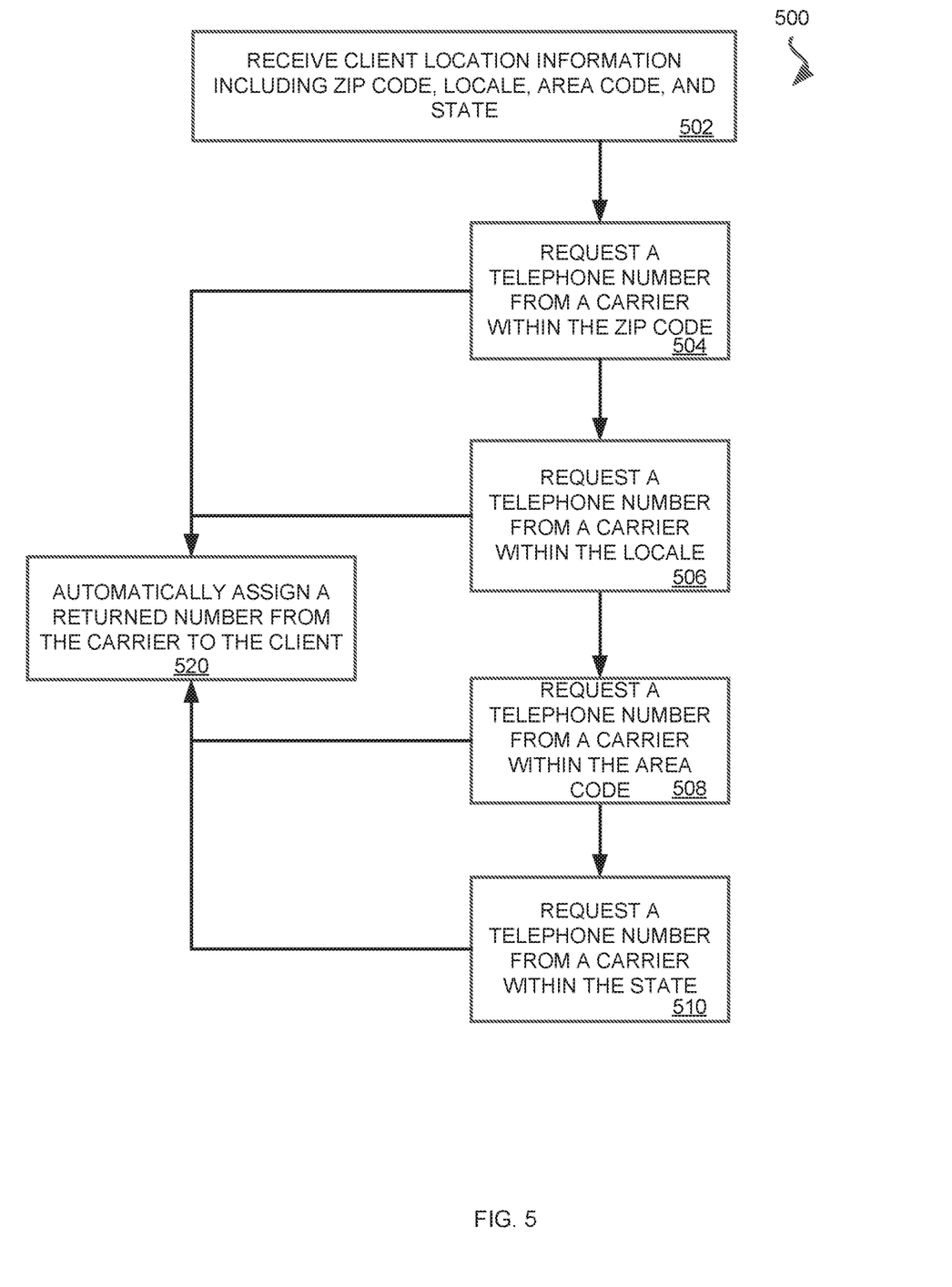
FIG. 5 is a flowchart depicting an example method for assigning a relevant telephone number to a client account, in accordance with various embodiments of the subject technology.

FIG. 5 is a flowchart depicting a method 500 for automatically assigning a relevant telephone number to a client. For example, account management system 302 of FIG. 3 discussed above may perform method 500 when a client sets up a new account.

At step 502, client location information is received, this client location information may include a zip code, a locale, an area code, and/or state information. At step 504, a telephone number matching the zip code is requested from a carrier. For example, a carrier API may provide an automated query and/or purchase mechanism. If a telephone number is returned as available, method 500 diverts to step 520, where the number returned from the carrier is automatically assigned to the client.

At step 506, if a number has not been assigned, a telephone number that matches the locale (e.g., city, metropolitan area, etc.) is requested from the carrier. Likewise, if a number is returned, method 500 diverts to step 520, otherwise method 500 continues iterating through steps 508-510.

At step 508, a telephone number matching the area code is requested from the carrier. At step 510, a telephone number matching the state is requested from the carrier. As with steps 504-506 above, if a number is returned at either steps 508-510, method 500 diverts to step 520 and assigns the returned number to the client. FIG. 5, thus illustrates that different types of location information may be used to identify phone numbers that may be called by the client. While the location information discussed in respect to FIG. 5 include a zip code, a locale, an area code, and state information, other forms of location information may be used to identify phone numbers. For example, global positioning system (GPS) data, cell tower location data, or cable company location data may be used to identify phone numbers. The location information relating to collected phone numbers may have been collected from one or more other service providers, for example an origination service provider, a cellular network service provider, a cable network service provider, an aggregator service provider, or other service provider.

Figure 6:
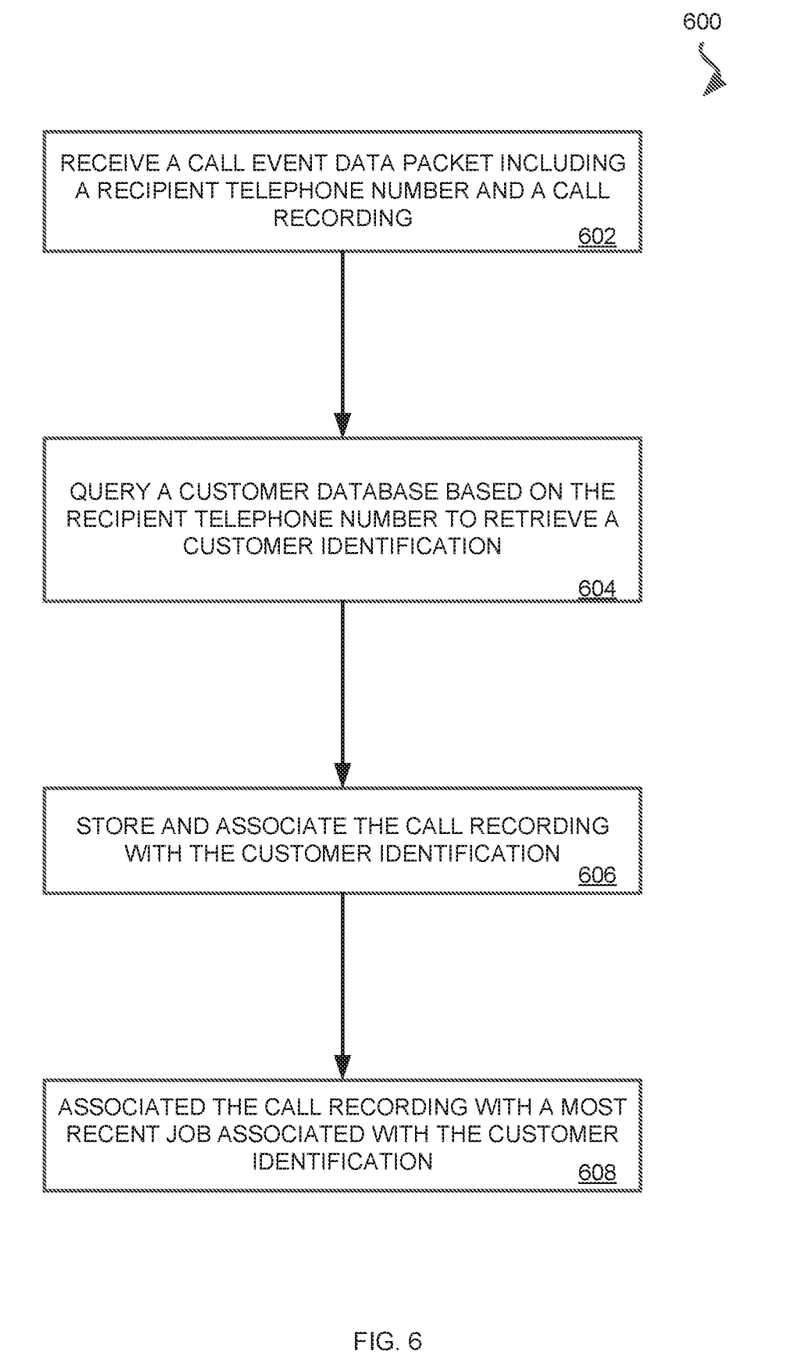
FIG. 6 is a flowchart depicting an example method for automatically associating a call recording with a customer, in accordance with various embodiments of the subject technology.

FIG. 6 is a flowchart depicting an example method for automatically associating a call recording with a customer. The flowchart of FIG. 6 illustrates method 600 for automatically logging call data. In some instances, method 600 may be performed by telephony platform 106 of FIG. 1.

At step 602, a call event data packet including a recipient telephone number and a call recording is received. In some examples, the call event data packet is received for substantially all calls made through the system and is automatically generated and received at specified call events such as, for example, a call being hung up. Specified call events may also include a verification that an order has been placed by a customer or a date that a product will be delivered or a service rendered. Specified call event data could identify a cost associated with an ordered product or service, or could identify the status of an order.

At step 604, a customer database (e.g., associated with or belong to a client) is queried based on the recipient telephone number to retrieve a customer identification. If a customer identification is not returned by the query, method 600 may conclude and the call event data packet may be discarded or provided to a downstream process or the like.

When step 604 successfully retrieves the customer identification, program flow may move to step 606, where the call recording is stored and associated with the customer identification returned by the query. Step 606 may store information that identifies events associated with the call. The information stored in step 606 may include the recipient phone number, one or more event identifiers, product order status, the customer identifier, and the recording of the call itself. Event information stored in step 606 may also include information about the call itself. As such, call information may identify carriers used to transfer voice data, metrics that identify call quality, a number of hops, or a number of errors or failures associated with the call, for example.

At step 608, a most recent job associated with the customer identification is associated with the call recording as well. Once a call is associated with the job, the data stored in step 606 may be updated to include a job identifier. In some examples, a customer identification may not be associated with a most recent, or any, job and so method 600 may accordingly conclude at step 606 instead of step 608.

Figure 7:
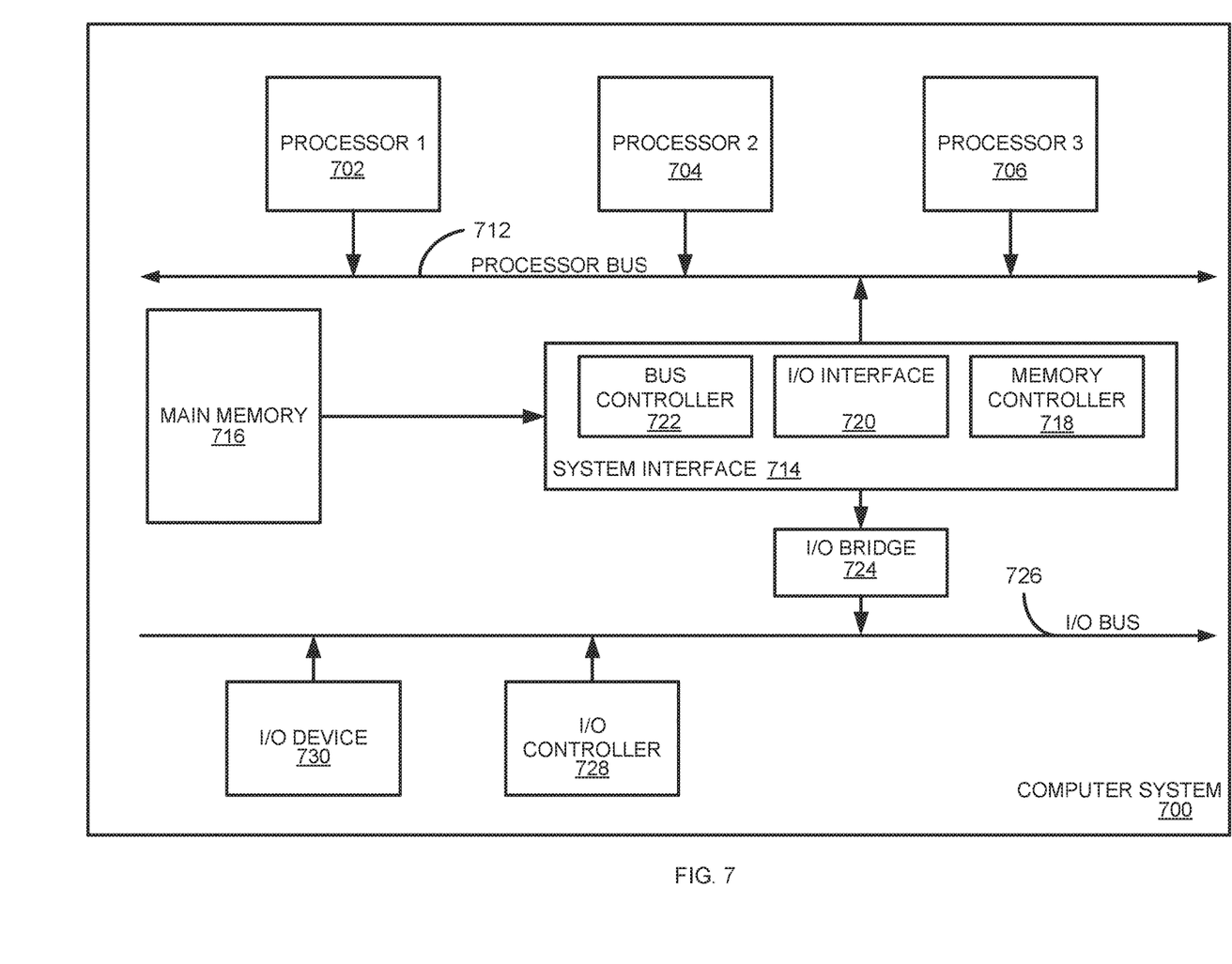
FIG. 7 is a diagram illustrating an example of a computing system which may be used in implementing various embodiments of the present disclosure.

FIG. 7 is a block diagram illustrating an example of a computing device or computer system 700 which may be used in implementing the embodiments of the components of the network disclosed above. For example, the computing system 700 of FIG. 7 may be the provider edge device discussed above. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 718 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. Bus controller 722 may be used to control communications with processor bus 712 or 726 respectively via I/O interface 720 and I/O bridge 724. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. Computer system 700 may also include or be coupled to a non-volatile data storage device (e.g. a disk drive, flash drive, flash memory, or other type of non-volatile data storage device). Computer system 700 may also include any wired or wireless network communication interface known in the art (e.g. Ethernet, Infiniband, 802.11, or Bluetooth interface) The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 716. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A computer-implemented method comprising:
    sending information regarding a most recent job associated with a recipient telephone number to a computing device of a customer service representative;
    causing initiation of a call back to a telephone associated with the recipient telephone number, to establish voice communications between the computing device of the customer service representative and the telephone;
    automatically receiving a call event data packet comprising the recipient telephone number and a call recording when it is verified that an order has been placed by a customer associated with the recipient telephone number or when a date that an ordered product will be delivered or an ordered service will be rendered is verified;
    querying a customer database based on the recipient telephone number to retrieve a customer identification;
    storing and associating the call recording with the customer identification; and
    associating the stored call recording with the most recent job associated with the customer identification.

2. The computer-implemented method of claim 1, further comprising:
    identifying one or more call quality metrics with a call associated with the call event data packet and with a first voice carrier; and
    storing the one or more call quality metrics at a database with a set of call quality metrics associated with the first voice carrier.

3. The computer-implemented method of claim 2, further comprising:
    identifying that a call quality metric associated with a second voice carrier is greater than one or more metrics of the set of call quality metrics; and
    identifying that a call to a second recipient telephone number should be initiated via the second voice carrier based on the second voice call quality metric being greater than the one or more metrics of the set of call quality metrics.

4. The computer-implemented method of claim 1, wherein causing initiation of the call back to the telephone associated with the recipient telephone number comprises establishing the voice communications between the computing device of the customer service representative and the telephone.

5. The computer-implemented method of claim 1, wherein the call event data packet is automatically received when a call associated with the call recording is terminated.

6. The computer-implemented method of claim 1, wherein the call event data packet indicates a status of the order.

7. The computer-implemented method of claim 1, wherein the call event data packet indicates a cost associated with the ordered product or the ordered service.

8. The computer-implemented method of claim 1, further comprising:
    storing, with the call recording and the customer identification, at least one of the recipient phone number, one or more event identifiers, a product order status, at least one carrier used to transfer voice data, at least one metric that identifies call quality, a number of hops, or a number of errors or failures associated with the call associated with the call recording.

* * * * *